United States Patent
Yang (10) Patent No.: US 6,752,473 B2
(45) Date of Patent: Jun. 22, 2004

(54) ELECTRONICALLY CONTROLLED BRAKE SYSTEM FOR AUTOMOBILES

(75) Inventor: I-Jin Yang, Pyungteak (KR)

(73) Assignee: Mando Corporation, Pyungtak (KR)

( * ) Notice: Subject to any disclaimer, the term of this patent is extended or adjusted under 35 U.S.C. 154(b) by 31 days.

(21) Appl. No.: 10/086,070

(22) Filed: Feb. 27, 2002

(65) Prior Publication Data

US 2003/0146658 A1 Aug. 7, 2003

(30) Foreign Application Priority Data

Feb. 1, 2002 (KR) .................................. 10-2002-0005839

(51) Int. Cl.[7] ................................................. B60T 8/40
(52) U.S. Cl. .................................. 303/116.2; 303/113.2
(58) Field of Search ........................... 303/113.1, 113.2, 303/116.1, 116.2

(56) References Cited

U.S. PATENT DOCUMENTS

| | | | | |
|---|---|---|---|---|
| 5,288,142 A | * | 2/1994 | Burgdorf ................. | 303/113.2 |
| 5,484,194 A | * | 1/1996 | Reinartz et al. ......... | 303/116.2 |
| 5,927,828 A | * | 7/1999 | Beck ....................... | 303/116.2 |
| 6,145,940 A |   | 11/2000 | Fuhrer et al. | |

* cited by examiner

Primary Examiner—Matthew C. Graham
(74) Attorney, Agent, or Firm—Ladas & Parry (57) ABSTRACT

An electronically controlled brake system for automobiles is disclosed. This brake system has a low/intermediate pressure accumulator, which is connected to both the NC-type solenoid valves and the oil suction line so as to store pressurized oil discharged from the wheel brakes during an ABS pressure reducing mode, and feed the stored pressurized oil to the inlet of an oil pump during an ABS pressure increasing mode. This accumulator also stores pressurized oil outputted from the oil pump to feed the stored pressurized oil to the inlet of the oil pump during an ESP mode. The low/intermediate pressure accumulator of this invention thus acts as a low pressure accumulator during an ABS mode, and acts as an intermediate pressure accumulator during an ESP mode. Due to such a low/intermediate pressure accumulator, it is possible to reduce the number of parts making up the brake system.

5 Claims, 8 Drawing Sheets

ELECTRONICALLY CONTROLLED BRAKE SYSTEM FOR AUTOMOBILES

BACKGROUND OF THE INVENTION

1. Field of the Invention

The present invention relates, in general, to an electronically controlled brake system for automobiles and, more particularly, to an electronically controlled brake system provided with a pressure accumulator temporarily storing both pressurized oil drained from wheel brakes and pressurized oil outputted from an oil pump.

2. Description of the Prior Art

A conventional brake system for automobiles consists of a booster and a master cylinder, which form braking oil pressure in response to a motion of a brake pedal and feeds the oil pressure to wheel brakes, thus reducing the traveling speed of an automobile or maintaining a stopped state of the automobile. However, the automobiles with such conventional brake systems may slip over a road in accordance with road surface conditions or variations in oil pressure during a braking operation.

Figure 1:
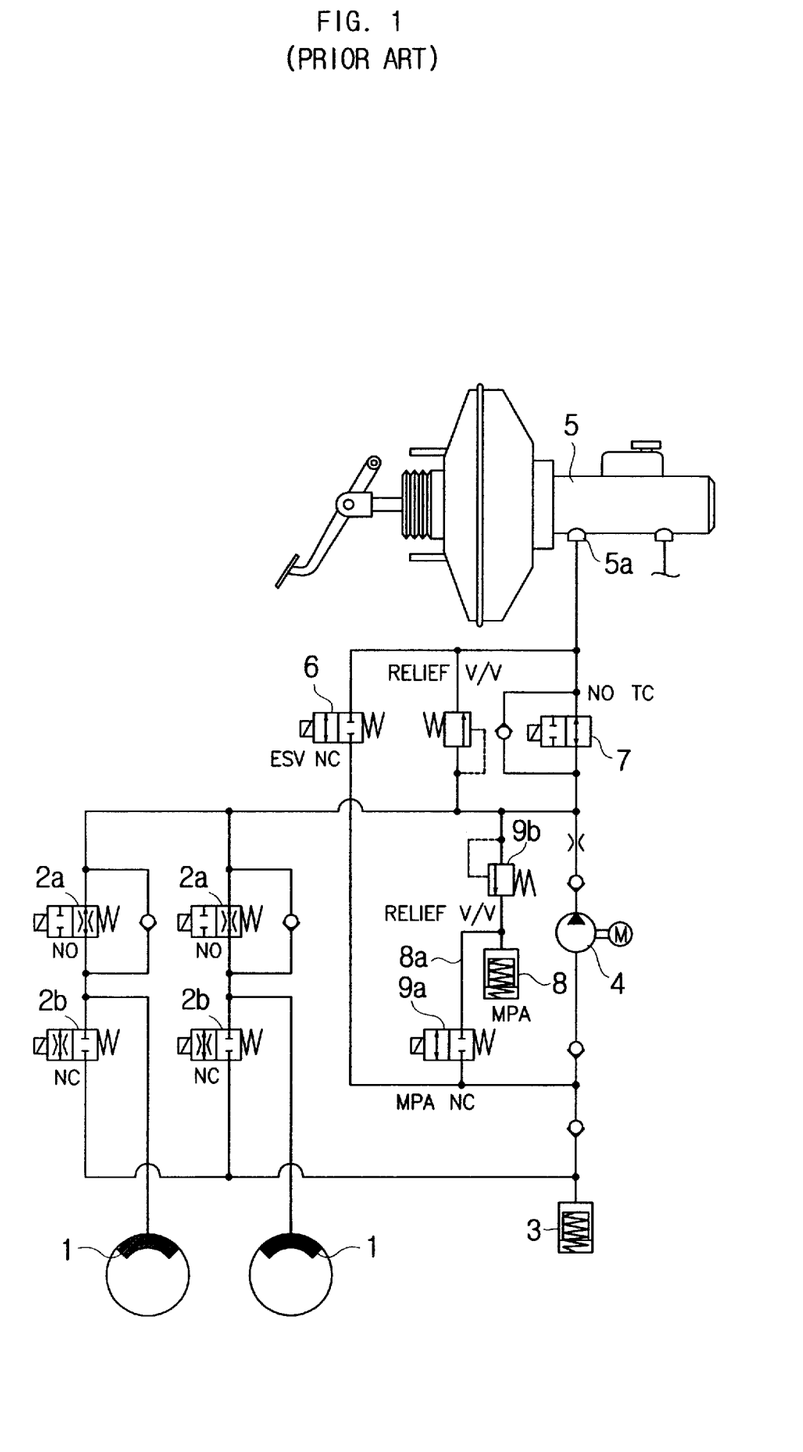
FIG. 1 is a hydraulic circuit diagram of a conventional electronically controlled brake system for automobiles.

In an effort to overcome such a problem, a variety of electronically controlled brake systems, such as an anti-lock brake system (ABS), a traction control system (TCS) and an active brake control system (ABCS), have been proposed and widely used. The ABS electronically controls the oil pressure fed to wheel brakes and prevents slippage of wheels during a braking operation. The TCS is designed to prevent excessive slippage of drive wheels during quick drive or sudden acceleration. The ABCS controls oil pressure in accordance with the traveling speed and steered angle of an automobile, thus securing the traveling stability while driving the automobile. FIG. 1 is a hydraulic circuit diagram of a conventional ABCS provided with an electronic stability program (ESP).

As shown in FIG. 1, the conventional ABCS consists of a plurality of solenoid valves 2a and 2b, which control a flow of pressurized oil fed to wheel brakes 1. The ABCS also has a low-pressure accumulator 3, which temporarily stores pressurized oil drained from the wheel brakes 1 during an ABS pressure reducing mode. An oil pump 4 sucks the pressurized oil from the low-pressure accumulator 3, and outputs the oil. A shuttle valve 6 is mounted on an oil suction line, which branches from the inlet line of the pump 4 and extends to the pressure inlet port 5a of a master cylinder 5. The shuttle valve 6 thus selectively opens or closes the oil suction line. A traction control solenoid valve 7 is mounted on an oil line, which extends from the inlet of the pump 4 to the pressure inlet port 5a of the master cylinder 5. The above valve 7 thus selectively opens or closes the oil line. The ABCS further includes an intermediate pressure accumulator 8, which temporarily stores pressurized oil fed from the pump 4. An electronic control unit (not shown) is included in the ABCS, and controls the electronic parts of the ABCS.

Of the solenoid valves 2a and 2b, each of the first valves 2a is an NO(normal open)-type solenoid valve and mounted on an oil line at an upstream position before an associated wheel brake 1, while each second valve 2b is an NC(normal close)-type solenoid valve and mounted on the oil line at a downstream position after the wheel brake 1. The two types of solenoid valves 2a and 2b are operated under the control of the electronic control unit. That is, the electronic control unit senses the traveling speed of an automobile, and controls the two types of solenoid valves 2a and 2b in accordance with sensed traveling speed of the automobile.

The low-pressure accumulator 3 is independently arranged in the hydraulic circuit of the ABCS while being commonly connected to the downstream lines of the two NC-type solenoid valves 2b, thus temporarily storing pressurized oil drained from the wheel brakes 1 during an ABS pressure reducing mode.

The intermediate-pressure accumulator 8 feeds pressurized oil to the inlet of the oil pump 4 during a TCS mode or an ESP mode. The above accumulator 8 is connected to a bypass line 8a, which bypasses pressurized oil, outputted from the pump 4, to the inlet side of the pump 4. An additional NC-type solenoid valve 9a is mounted on the bypass line 8a at a downstream position after the intermediate-pressure accumulator 8, and opens the bypass line 8a during a TCS mode or an ESP mode. A relief valve 9b is mounted on the bypass line 8a at an upstream position before the intermediate-pressure accumulator 8. This relief valve 9b returns excessively pressurized oil to the master cylinder 5 during a TCS mode or an ESP mode.

The solenoid valves 2a and 2b, oil pump 4, low-pressure accumulator 3, intermediate-pressure accumulator 8, and relief valve 9b are compactly set in a single hydraulic block (not shown), which is made of aluminum to form a cubic shape.

However, the conventional ABCS must separately set the low-pressure accumulator 3 and the intermediate-pressure accumulator 8 in the hydraulic block, since it is necessary to temporarily store pressurized oil, drained from the wheel brakes 1 during an ABS pressure reducing mode, in the low-pressure accumulator 3, and feed pressurized oil from the intermediate-pressure accumulator 8 to the inlet of the oil pump 4 during a TCS mode or an ESP mode. Due to the two accumulators 3 and 8 separately set in the hydraulic block, it is only limitedly possible to accomplish desired compactness of the hydraulic block, in addition to an increase in the production cost of the ABCS.

Furthermore, upsetting noises are generated when pressurized oil passes through the relief valve 9b during a process of feeding the pressurized oil to the intermediate-pressure accumulator 8.

SUMMARY OF THE INVENTION

Accordingly, the present invention has been made keeping in mind the above problems occurring in the prior art, and an object of the present invention is to provide an electronically controlled brake system for automobiles, the low-pressure accumulator of which is integrated with the intermediate-pressure accumulator into a single body, thus accomplishing desired compactness of the brake system and reducing the production cost of the brake system.

In order to accomplish the above objects, the present invention provides an electronically controlled brake system for automobiles, comprising: an NO-type solenoid valve arranged at an upstream line of a wheel brake and controlling a flow of pressurized oil fed from both a master cylinder and an outlet of an oil pump to the wheel brake; an NC-type solenoid valve arranged at a downstream line of the wheel brake and controlling a flow of pressurized oil discharged from the wheel brake; an oil suction line connecting the master cylinder to the inlet of the oil pump and feeding pressurized oil from the master cylinder to the oil pump during a TCS mode; an NC-type shuttle valve mounted on the oil suction line to open or close the oil suction line; and a low/intermediate pressure accumulator connected to both the outlet of the NC-type solenoid valve and the oil suction line so as to store the pressurized oil discharged from the wheel brake during an ABS pressure reducing mode, and feed the stored pressurized oil to the inlet of the oil pump during an ABS pressure increasing mode, the pressure accumulator also storing the pressurized oil outputted from the oil pump to feed the stored pressurized oil to the inlet of the oil pump during an ESP mode.

The brake system of this invention further comprises: an oil charging line extending from the outlet of the oil pump to the low/intermediate pressure accumulator; a first control valve mounted on the oil charging line to open or close the oil charging line; an oil feeding line branching from the oil charging line at a downstream position after the first control valve and connected to the oil suction line at a downstream position after the NC-type shuttle valve; and a second control valve mounted on the oil feeding line to open or close the oil feeding line such that the oil feeding line is opened during the ESP mode so as to feed the pressurized oil from the low/intermediate pressure accumulator to the inlet of the oil pump.

In the brake system, wherein the first and second control valves are NC-type solenoid valves.

In the brake system, the first control valve is a check valve which is opened when pressure of oil outputted from the oil pump is not lower than a predetermined reference level, and which prevents an inverse flow of pressurized oil charged in the low/intermediate pressure accumulator.

The low/intermediate pressure accumulator comprises: a cylinder receiving pressurized oil therein; a piston received in the cylinder to extend from or retract into the cylinder in accordance with a flow of pressurized oil into or from the cylinder; an elastic member elastically supporting the piston; and a position sensor sensing a movement of the piston exceeding a predetermined stroke, whereby the position sensor stops an operation of the oil pump when the piston moves by a length exceeding the predetermined stroke during an oil charging mode.

In the brake system, a check valve is mounted on an oil line extending from the inlet of the oil pump to the low/intermediate pressure accumulator. This check valve thus opens the oil line to feed pressurized oil from the low/intermediate pressure accumulator to the inlet of the oil pump when pressure of the pressurized oil discharged from the wheel brake to the low/intermediate pressure accumulator during the ABS pressure reducing mode is not lower than a predetermined reference level.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 2:
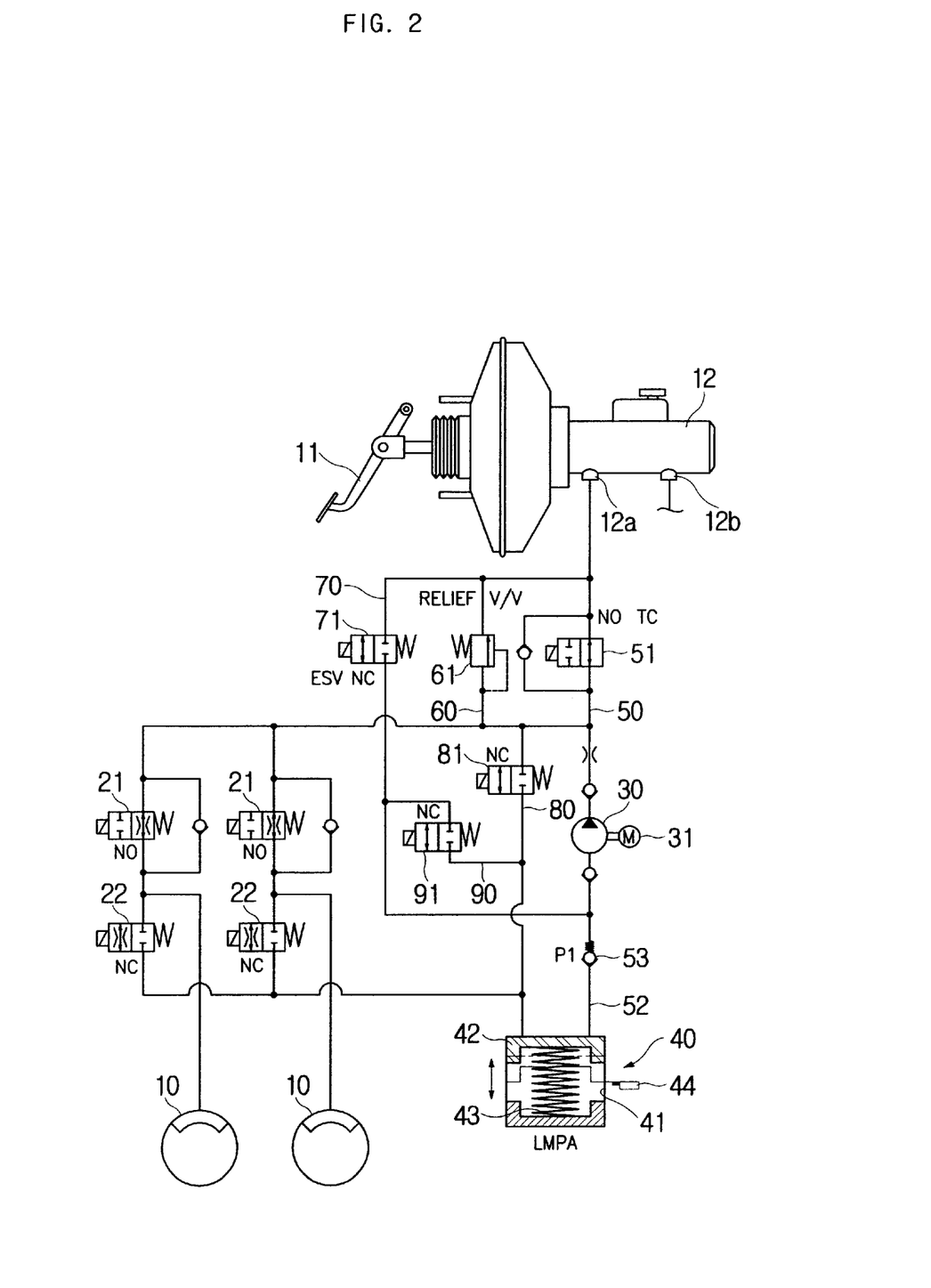
FIG. 2 is a hydraulic circuit diagram of an electronically controlled brake system for automobiles in accordance with the primary embodiment of the present invention.

Reference now should be made to the drawings, in which the same reference numerals are used throughout the different drawings to designate the same or similar components. In the following description, the present invention is adapted to an ABCS (active brake control system), which is a kind of electronically controlled brake system and has an ESP line. The brake system of this invention has two hydraulic circuits: a primary hydraulic circuit connected to the primary port 12a of the master cylinder 12 as shown in FIG. 2 and a secondary hydraulic circuit connected to the secondary port 12b of the master cylinder 12. The two hydraulic circuits have a symmetric construction, and so it should be understood that only the primary hydraulic circuit is shown in the drawings and described in the following description.

As shown in FIG. 2, the electronically controlled brake system for automobiles in accordance with the primary embodiment of this invention consists of a plurality of solenoid valves 21 and 22, which control a flow of pressurized oil fed to wheel brakes 10 provided at the front and rear wheels of an automobile. The brake system also has an oil pump 30, which sucks pressurized oil from both the wheel brakes 10 and the master cylinder 12, and outputs the oil. A low/intermediate pressure accumulator 40 is included in the brake system for temporarily storing pressurized oil drained from the wheel brakes 10 and pressurized oil outputted from the pump 30, and feeding the stored oil to the inlet of the pump 30. The brake system further includes an electronic control unit (ECU, not shown), which controls the electronic parts of the system. The above-mentioned parts of the brake system are compactly set in a hydraulic block (not shown).

Of the solenoid valves 21 and 22, each of the first valves 21 is mounted on an oil line at an upstream position before an associated wheel brake 10 and uses an NO(normal open)-type solenoid valve which is normally kept open, while each second valve 22 is mounted on the oil line at a downstream position after the wheel brake 10 and uses an NC(normal close)-type solenoid valve which is normally kept closed. The two types of solenoid valves 21 and 22 are operated under the control of the electronic control unit. That is, the electronic control unit senses the traveling speed of the automobile using a plurality of wheel sensors (not shown) provided at positions around the wheels, and controls the two types of solenoid valves 21 and 22 in accordance with sensed traveling speed of the automobile. During a pressure reducing mode braking operation, the NC-type solenoid valves 22 are opened to feed pressurized oil drained from the wheel brakes 10 to the low/intermediate pressure accumulator 40, thus allowing the oil to be temporarily stored in the accumulator 40.

The oil pump 30 is operated by a motor 31 to suck pressurized oil from the low/intermediate pressure accumulator 40, and output the oil to the wheel brakes 10 or the master cylinder 12.

The primary port 12a of the master cylinder is connected to the outlet of the oil pump 30 through a main line 50, with an additional NO-type solenoid valve 51 mounted on the main line 50 for performing a traction control. This NO-type solenoid valve 51 is referred to simply as a TC solenoid valve herein below. The TC solenoid valve 51 is normally kept open to feed pressurized oil from the master cylinder 12 to the wheel brakes 10 through the main line 50 during a general mode braking operation actuated by a brake pedal 11. However, this TC solenoid valve 51 is closed by the ECU during a traction control mode (TCS mode) as will be described later herein.

A relief line 60 branches from the main line 50 at a position between the outlet of the pump 30 and the TC solenoid valve 51, and is connected to the primary port 12a of the master cylinder 12. A relief valve 61 is mounted on the relief line 60 and controls the line 60. The relief line 60 with the relief valve 61 is used for feeding pressurized oil from the pump 30 back to the master cylinder 12 when pressure of the oil outputted from the pump 30 increases to exceed a predetermined reference level during a TCS mode.

An oil suction line 70 branches from the main line 50 so as to connect the primary port 12a of the master cylinder 12 to the inlet of the oil pump 30 and feed pressurized oil from the master cylinder 12 to the inlet of the pump 30. An NC-type electric shuttle valve 71 is mounted on the oil suction line 70 to open or close the line 70.

The low/intermediate pressure accumulator 40 is connected to both the outlets of the NC-type solenoid valves 22 and the oil suction line 70 so as to temporarily store the pressurized oil discharged from the wheel brakes 10 during an ABS pressure reducing mode, and feed the stored pressurized oil to the inlet of the oil pump 30 during an ABS pressure increasing mode. This low/intermediate pressure accumulator 40 also stores pressurized oil outputted from the oil pump 30 to feed the stored pressurized oil to the inlet of the pump 30 during an ESP mode. In order to accomplish the above operation, the brake system of this invention further comprises an oil charging line 80, which is opened or closed by a first control valve 81. In addition, an oil feeding line 90 branches from the oil charging line 80 to be connected to the oil suction line 70, and is opened or closed by a second control valve 91.

In a detailed description, the oil charging line 80 extends at a first end thereof from an oil line, which connects the outlet of the oil pump 30 to the two NO-type solenoid valves 21. That is, the first end of the oil charging line 80 branches from the main line 50 at a downstream position after the TC solenoid valve 51. The second end of the oil charging line 80 is connected to the low/intermediate pressure accumulator 40. The first control valve 81 is mounted on the oil charging line 80 to open or close the line 80. In the primary embodiment of this invention, the first control valve 81 is an NC-type solenoid valve, which is operated under the control of the ECU.

The oil feeding line 90 branches at its first end from the oil charging line 80 at a downstream position after the first control valve 81, and is connected at its second end to the oil suction line 70 at a downstream position after the NC-type shuttle valve 71. The second control valve 91 is mounted on the oil feeding line 90 to open or close the line 90. In the primary embodiment, the second control valve 91 is an NC-type solenoid valve, and is opened during an ESP mode so as to feed the pressurized oil from the low/intermediate pressure accumulator 40 to the inlet of the oil pump 30 through both the oil feeding line 90 and the oil suction line 70.

The low/intermediate pressure accumulator 40 comprises a cylinder 41, which is formed in the hydraulic block and receives pressurized oil therein. A piston 42 is received in the cylinder 41 to extend from or retract into the cylinder 41 in accordance with a flow of pressurized oil into or from the cylinder 41. An elastic member 43 elastically supports the piston 42 in the cylinder 41. The pressure accumulator 40 also has a position sensor 44, which senses a movement of the piston 42 exceeding a predetermined stroke. The position sensor 44 is electrically connected to the ECU, and stops the operation of the oil pump 30 when excessively pressurized oil with pressure of not lower than a predetermined reference level (about 3 bar) is introduced into the accumulator 40 to move the piston 42 by a length exceeding the predetermined stroke during an oil charging mode. In such a case, the restoring force of the elastic member 43 determines the pressure of the pressurized oil charged in the accumulator 40.

In addition, a check valve 53 is mounted on the oil line 52 extending from the inlet of the oil pump 30 to the low/intermediate pressure accumulator 40. When pressure of pressurized oil discharged from the wheel brakes 10 to the low/intermediate pressure accumulator 40 during an ABS pressure reducing mode is not lower than the predetermined reference level (about 3 bar), the check valve 53 opens the oil line 52 to feed pressurized oil from the pressure accumulator 40 to the inlet of the oil pump 30.

The operational effect of the electronically controlled brake system of this invention will be described herein below.

Figure 3:
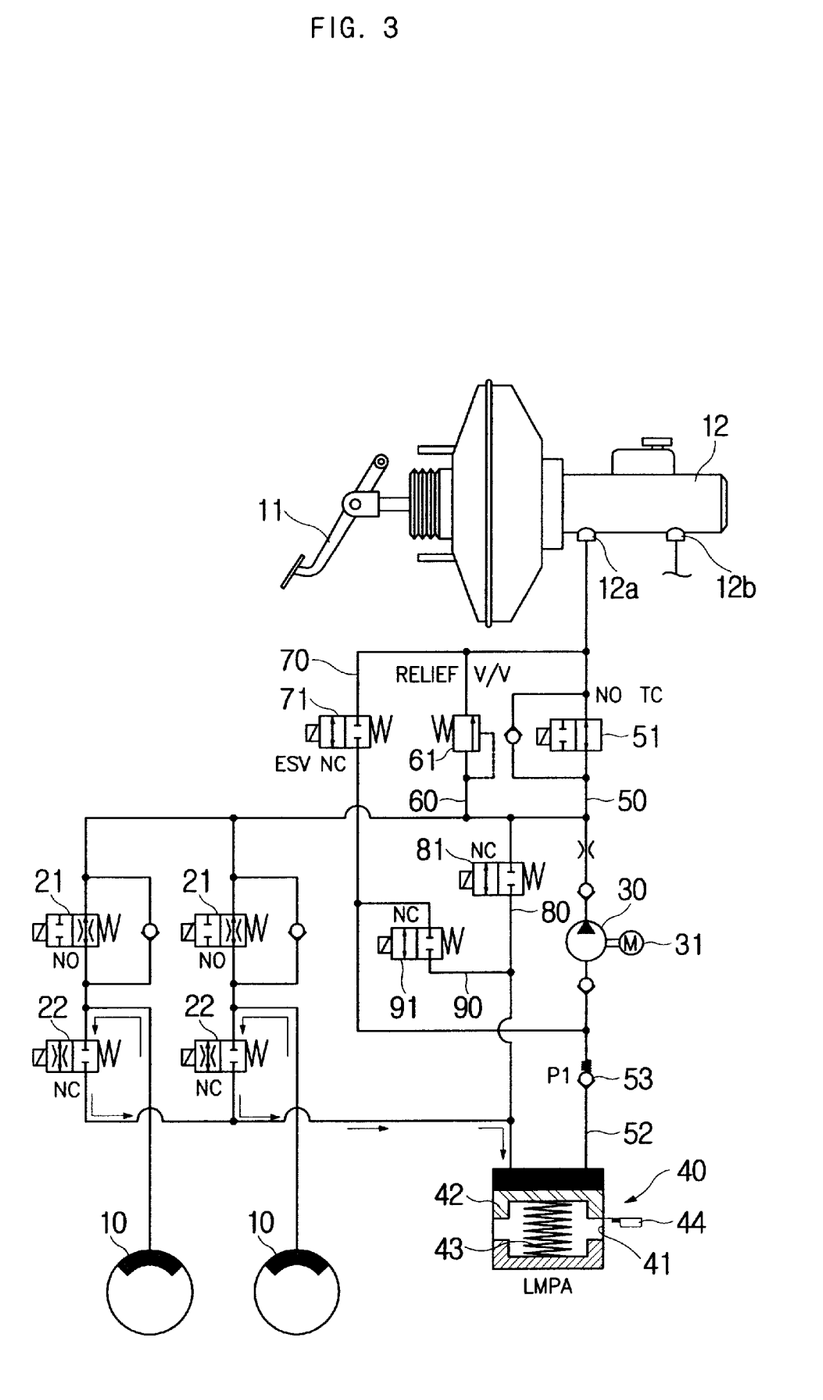
FIG. 3 is a hydraulic circuit diagram of the brake system of this invention operated in an ABS pressure reducing mode.

When an automobile with the brake system of this invention slips on a road during a braking operation, the ECU controls the brake system to perform an ABS braking operation in a pressure reducing mode, pressure increasing mode or pressure maintaining mode in response to signals outputted from the wheel sensors. The ABS braking operation of this brake system in the above-mentioned three modes is performed as follows:

When pressurized oil is applied from the master cylinder 12 to the wheel brakes 10, and brakes the wheels in response to an actuation of the brake pedal 11, pressure of the oil inside the wheel brakes 10 may be higher than a desired level determined by the road conditions. In such a case, it is necessary to reduce the pressure of the brake oil to an appropriate level, and so the ECU opens the NC-type solenoid valves 22 to perform an ABS pressure reducing mode. When the ABS pressure reducing mode is started, a part of pressurized oil is discharged from the wheel brakes 10 as shown by the arrows of FIG. 3, and flows into the cylinder 41 of the low/intermediate pressure accumulator 40 while retracting the piston 42 into the cylinder 41. The pressurized oil discharged from the brakes 10 is thus temporarily stored in the accumulator 40. In such a case, initial pressure of oil inside the wheel brakes 10 is about 6 bar, and oil of about 3 bar is drained from the wheel brakes 10 to the accumulator 40. When the pressure of the oil flowing into the accumulator 40 exceeds 3 bar, the check valve 53 is opened to feed the oil to the inlet of the oil pump 30. The braking pressure of the wheel brakes 10 is thus reduced to an appropriate level through the above-mentioned process, and prevents slippage of the wheels on the road during the braking operation.

Figure 4:
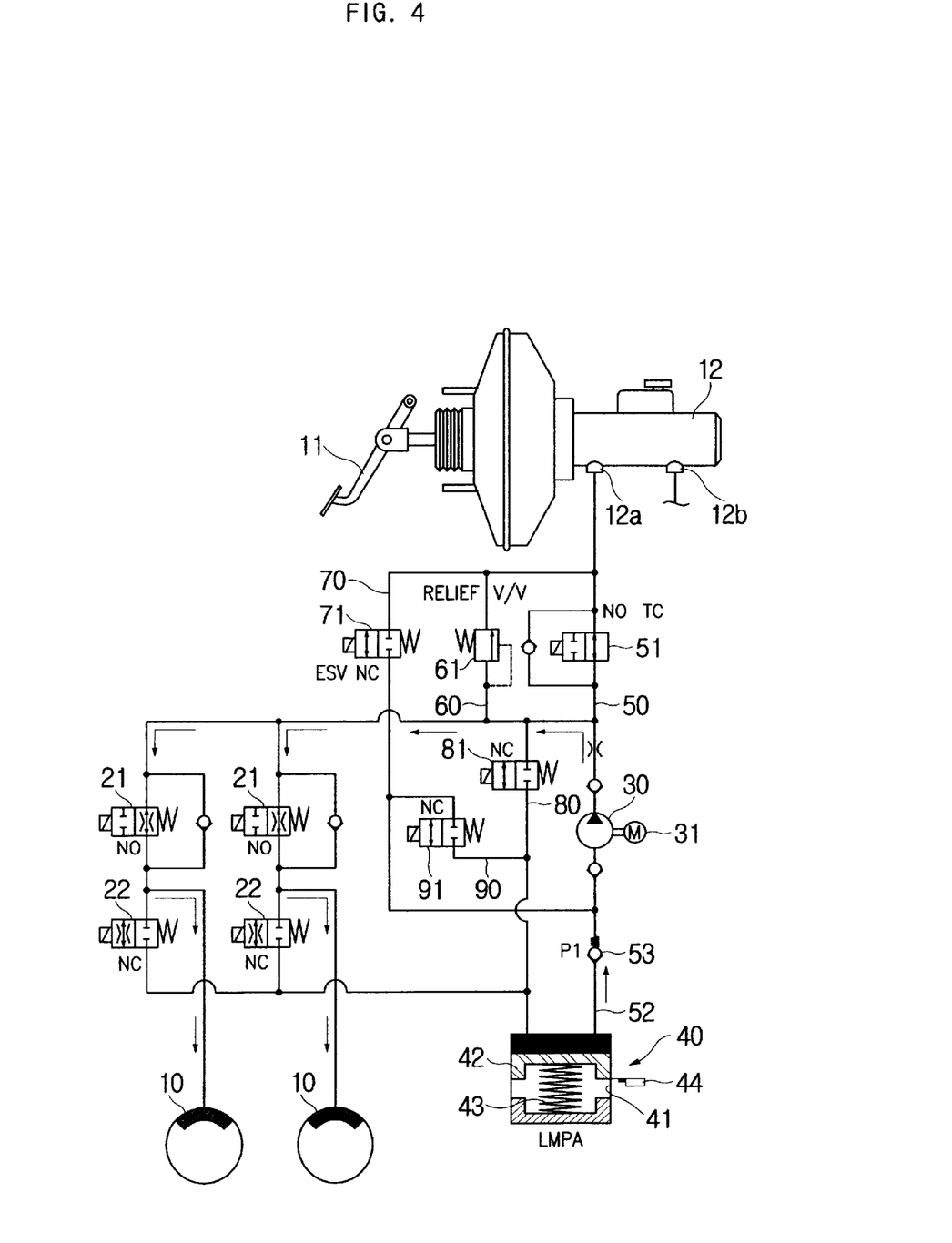
FIG. 4 is a hydraulic circuit diagram of the brake system of this invention operated in an ABS pressure increasing mode.

When such an ABS pressure reducing mode is maintained for a predetermined lengthy period of time, braking pressure of the wheel brakes 10 is reduced, resulting in a reduction in the braking efficiency of the brake system. In such a case, the ECU performs an ABS pressure increasing mode, wherein the oil pump 30 is started and increases the pressure of oil inside the wheel brakes 10. During such an ABS pressure increasing mode, oil stored in the low/intermediate pressure accumulator 40 is pumped by the oil pump 30, and is fed to the wheel brakes 10 through the open NO-type solenoid valves 21 as shown by the arrows of FIG. 4. The braking pressure of the wheel brakes 10 is thus increased.

During a braking operation, it is necessary for the brake system to perform an ABS pressure maintaining mode, wherein the braking pressure of a desired wheel brake 10 is maintained at a predetermined level when the braking pressure reaches a desired level capable of generating an optimum braking force or it is desired to prevent a resonance of the automobile. That is, the ABS pressure maintaining mode maintains the braking pressure of the desired wheel brake 10 without allowing a variation in the pressure, and closes the NO-type solenoid valve 21 associated with the desired wheel brake 10, thus preventing a supplying of additional oil to the wheel brake 10. In such a case, pressurized oil outputted from the oil pump 30 is fed to the master cylinder 12 through the open TC solenoid valve 51, and so the ABS pressure maintaining mode is stably performed.

At the final stage of the ABS mode operation, it is preferable to open the first control valve 81 of the oil charging line 80 and reduce the oil pressure of the accumulator 40.

A TCS mode of the brake system of this invention is performed as follows, in the case of quick drive of the automobile.

Figure 5:
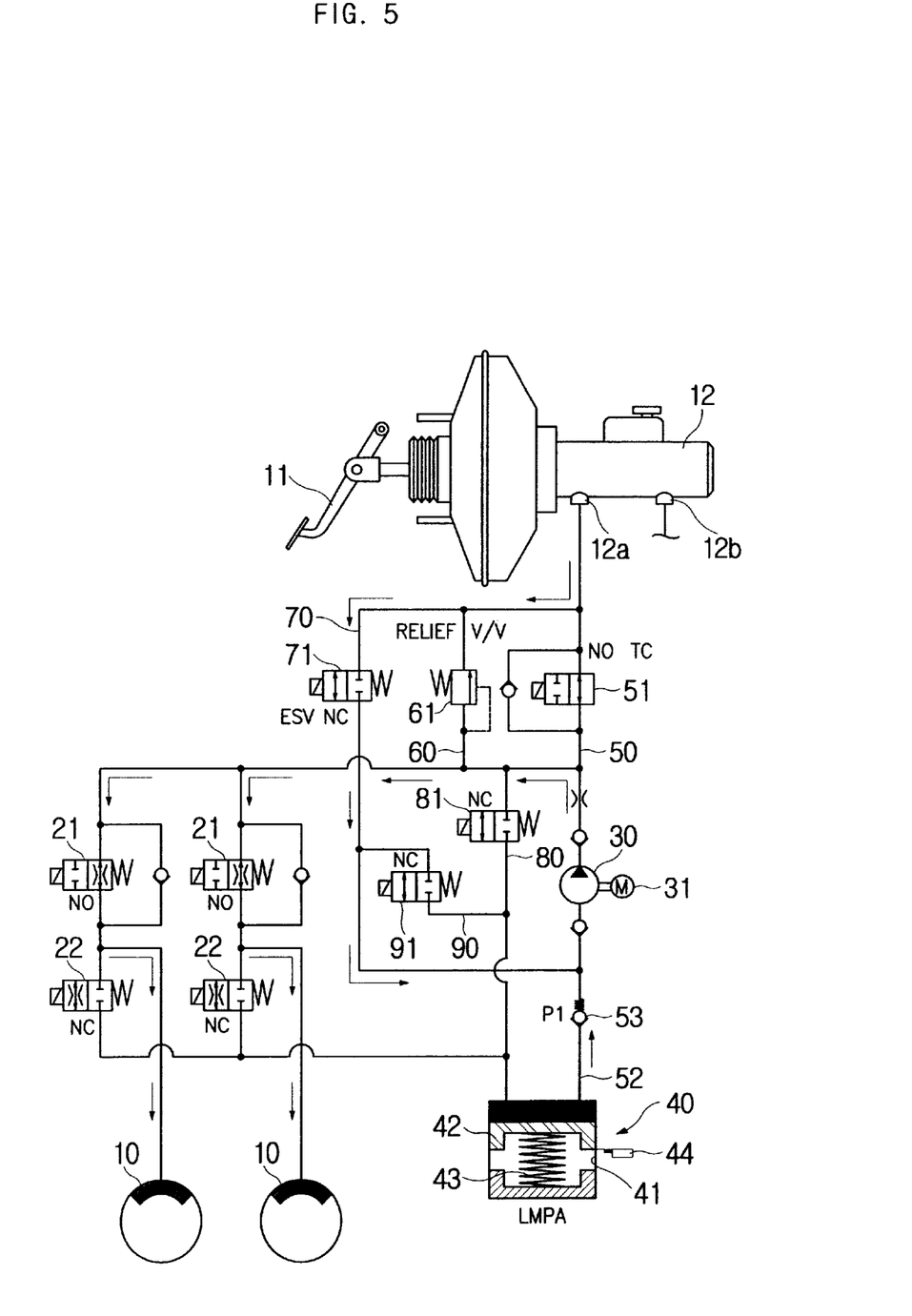
FIG. 5 is a hydraulic circuit diagram of the brake system of this invention operated in a TCS mode.

When a driver strongly actuates the accelerator pedal to quickly accelerate the automobile on a slippery road, the automobile may slip over the road. When the automobile slips over a road due to its high speed, the wheel sensors sense the slippage of the automobile, and output signals to the ECU. In response to the signals from the wheel sensors, the ECU opens the NC-type shuttle valve 71 of the oil suction line 70, closes the TC solenoid valve 51 of the main line 50, and starts the oil pump 30 to perform a TCS mode.

During such a TCS mode, pressurized oil of the master cylinder 12 is sucked into the inlet of the oil pump 30 through the oil suction line 70, as shown by the arrows of FIG. 5, while pressurized oil outputted from the outlet of the pump 30 is fed to the wheel brakes 10 through the main line 50 and the NO-type solenoid valves 21, thus generating braking pressure in the wheel brakes 10. Therefore, when a driver strongly actuates the accelerator pedal to quickly accelerate the automobile on a slippery road, the brake system of this invention automatically locks the wheels of the automobile, even though the driver does not actuate the brake pedal. The automobile thus stably and safely accelerates on a slippery road.

An ESP mode of the brake system of this invention is performed as follows:

When an automobile travels on a slippery road or a curved road at high speeds, the automobile may not be controlled by a driver, but yaw on the road to spin. In such a case, the brake system of this invention performs an ESP mode, wherein appropriate braking pressures are independently applied to the brake wheels 10, and allow the automobile to stably and safely travel on the road.

Figure 6:
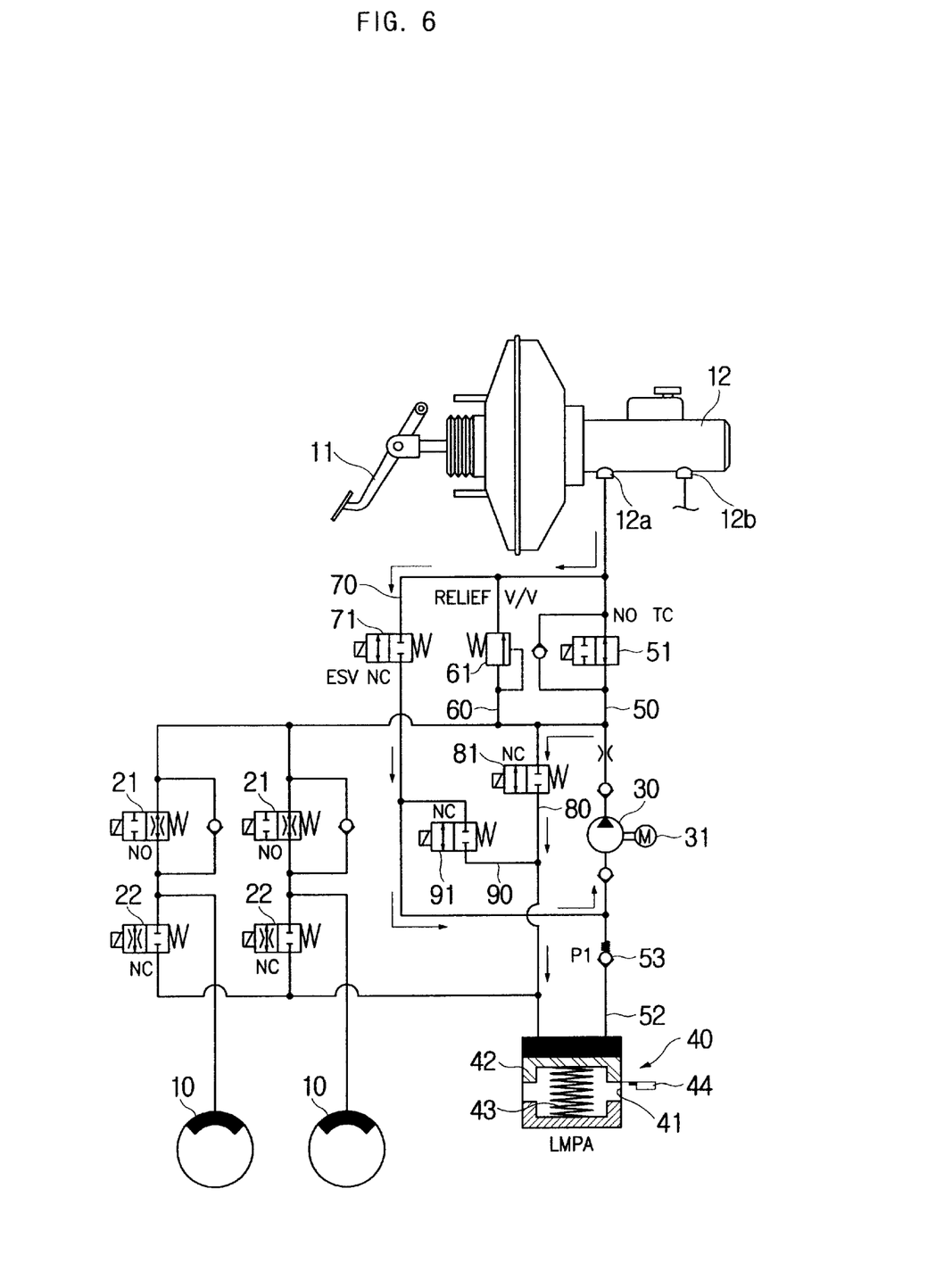
FIG. 6 is a hydraulic circuit diagram of the brake system of this invention operated in an oil charging mode.

That is, at the same time of the starting of the engine, the ECU starts the oil pump 30 after closing both the TC solenoid valve 51 and the NO-type solenoid valves 21, and opening both the NC-type shuttle valve 71 and the first control valve 81. An oil charging mode is thus performed.

Therefore, as shown by the arrows of FIG. 6, pressurized oil of the master cylinder 12 is fed to the inlet of the oil pump 30 through the oil suction line 70, and pressurized oil outputted from the outlet of the pump 30 is fed to the low/intermediate pressure accumulator 40 through the oil charging line 80, thus being charged in the accumulator 40. When pressure of the oil charged in the accumulator 40 exceeds a predetermined reference level and causes the piston 42 to move by a length exceeding a predetermined stroke, the position sensor 44 senses the excessive movement of the piston 42 and stops the pump 30. Therefore, appropriately pressurized oil of about 3 bar is quickly charged in the low/intermediate pressure accumulator 40, simultaneously with the starting of the engine. In such a case, the oil charging mode for charging pressurized oil in the accumulator 40 is performed while opening the first control valve 81 which is an NC-type solenoid valve, and so the brake system does not generate operational noise during the oil charging mode. Such an oil charging mode for charging pressurized oil in the accumulator 40 is performed at the start of engine operation and is periodically performed in consideration of oil leakage, and so the accumulator 40 is always charged with pressurized oil of 3 bar.

Figure 7:
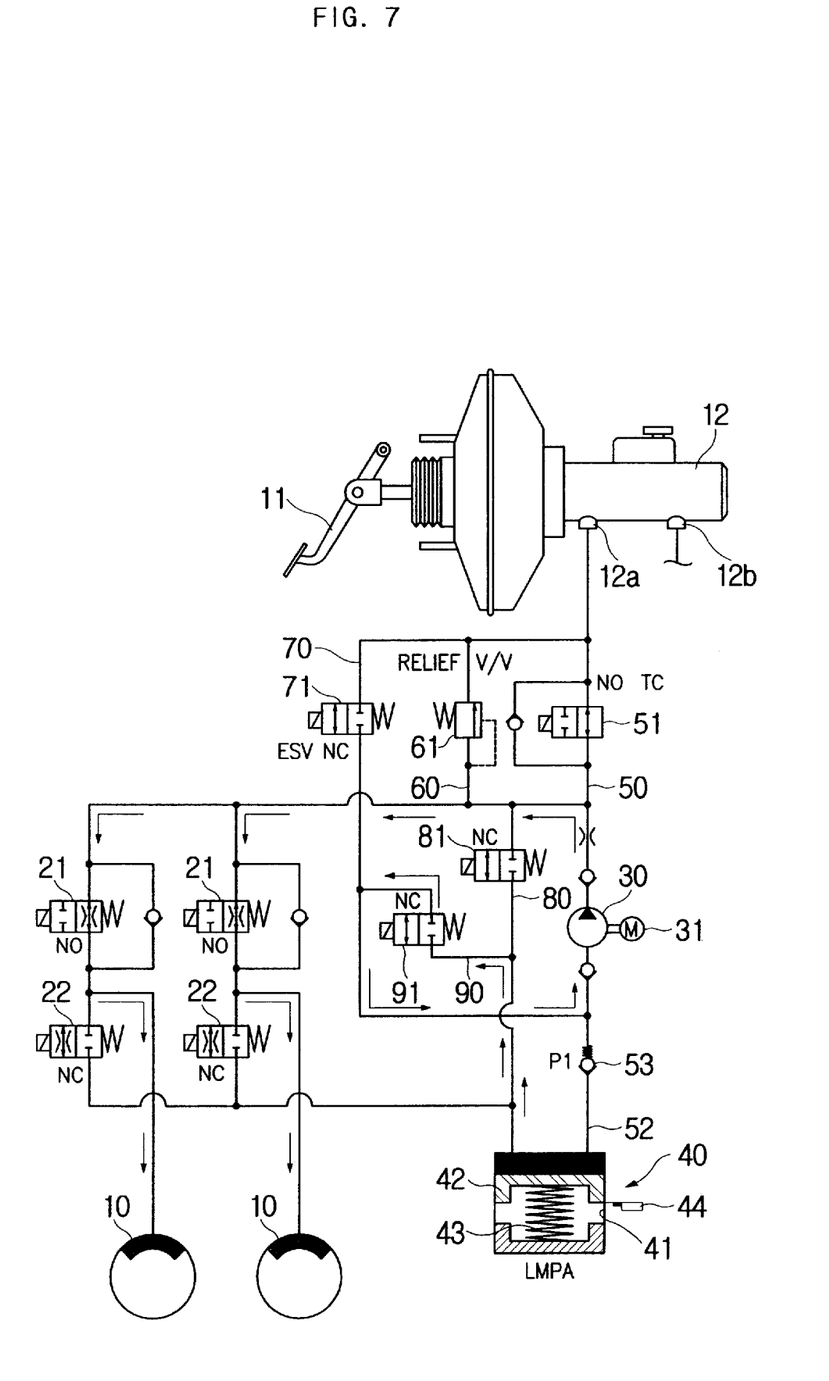
FIG. 7 is a hydraulic circuit diagram of the brake system of this invention operated in an ESP mode.

When a driver excessively rotates the wheels to exceed a predetermined steering angle while cornering on a road while pressurized oil is charged in the low/intermediate pressure accumulator 40 as described above, the automobile may be over-steered to lean centripetally relative to a cornering direction, or under-steered to lean centrifugally relative to the cornering direction. Such over-steering or under-steering may be caused by frictional conditions of the road.

When the automobile is subjected to such over-steering or under-steering while cornering, the ECU opens the second control valve 91 of the oil feeding line 90, but closes the TC solenoid valve 51 to shut the oil line between the master cylinder 12 and the wheel brakes 10, and starts the oil pump 30. Therefore, as shown by the arrows of FIG. 7, pressurized oil of the low/intermediate pressure accumulator 40 is fed to the inlet of the pump 30 through both the oil feeding line 90 and the oil suction line 70. In addition, pressurized oil outputted from the outlet of the pump 30 is fed to the wheel brakes 10 to supply braking pressure to the brakes 10.

When the automobile is subjected to an over-steering, the pressurized oil from the accumulator 40 is fed to the wheel brakes 10 positioned outside relative to the cornering direction to form braking pressure to said outside brakes 10. When the automobile is subjected to an under-steering, the pressurized oil from the accumulator 40 is fed to the wheel brakes 10 positioned inside relative to the cornering direction to form braking pressure in the inside wheel brakes 10. Therefore, the brake system of this invention allows the automobile to stably and safely corner on a road in accordance with a steering action performed by a driver.

Since pressurized oil from the low/intermediate pressure accumulator 40 is directly fed to the inlet of the oil pump 30 during such an ESP mode, it is possible to more quickly feed braking pressure to the wheel brakes 10.

Figure 8:
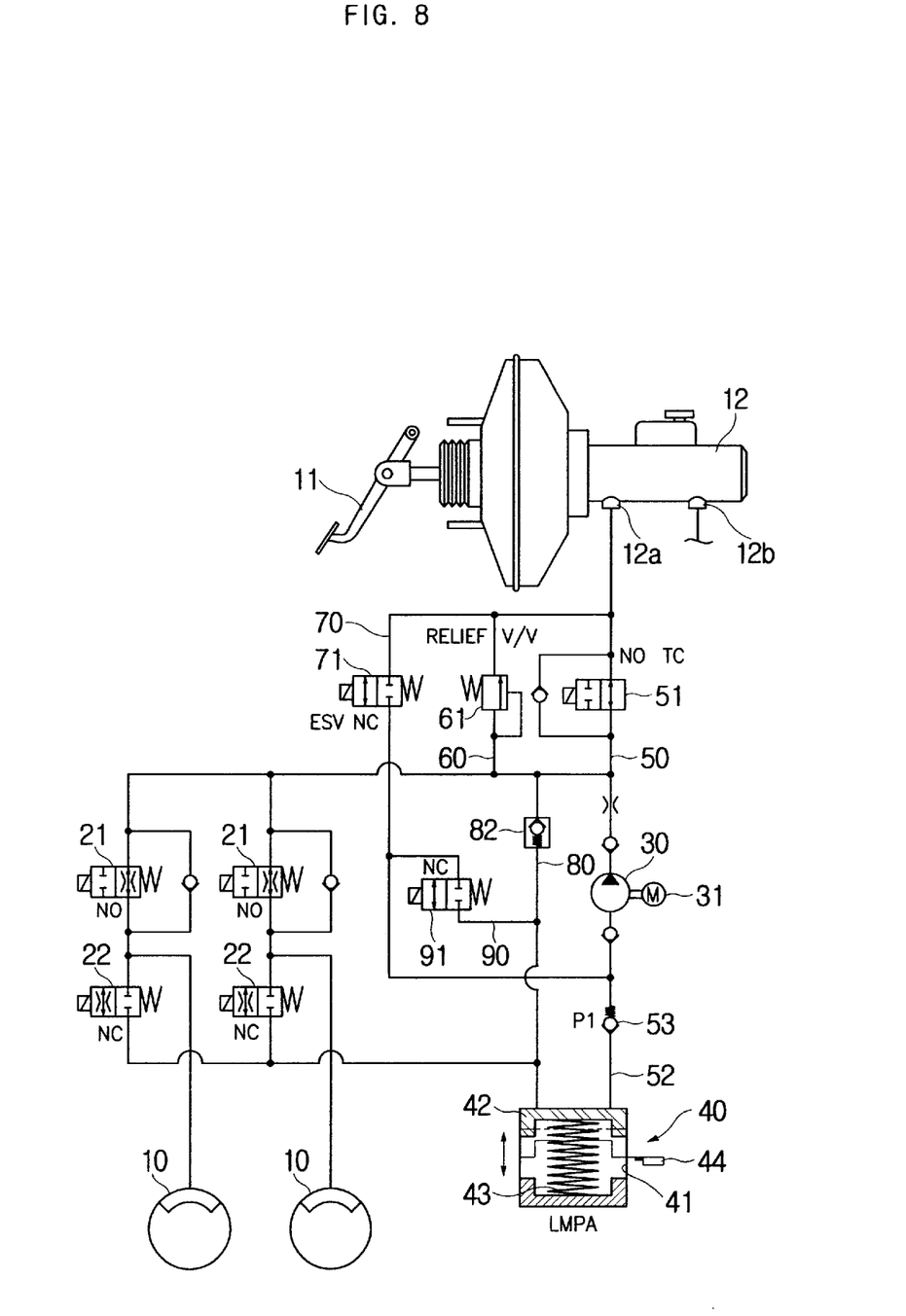
FIG. 8 is a hydraulic circuit diagram of an electronically controlled brake system for automobiles in accordance with the second embodiment of the present invention.

In the preferred embodiment, the first control valve 81 mounted on the oil charging line 80 is an NC-type solenoid valve. However, it should be understood that a check valve in place of such an NC-type solenoid valve may be used as the first control valve. That is, as shown in FIG. 8, the first control valve of the oil charging line 80 uses a check valve 82, which is opened only when pressure of oil fed from the pump 30 to the accumulator 40 is not lower than a predetermined reference level, and prevents an inverse flow of pressurized oil charged in the accumulator 40.

As described above, the present invention provides an electronically controlled brake system for automobiles. This brake system has a low/intermediate pressure accumulator, which is connected to both the NC-type solenoid valves and the oil suction line so as to store pressurized oil discharged from the wheel brakes during an ABS pressure reducing mode, and feed the stored pressurized oil to the inlet of an oil pump during an ABS pressure increasing mode. This pressure accumulator also stores pressurized oil outputted from the oil pump to feed the stored pressurized oil to the inlet of the oil pump during an ESP mode. The low/intermediate pressure accumulator of this invention thus acts as a low pressure accumulator during an ABS mode, and acts as an intermediate pressure accumulator during an ESP mode. Due to such a low/intermediate pressure accumulator, it is possible to reduce the number of parts of the brake system, accomplish the recent trend of compactness of hydraulic blocks, and reduce the production cost of the brake system.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electronically controlled brake system, comprising:
   an NO (normally open)-type solenoid valve arranged at an upstream line of a wheel brake and controlling a flow of pressurized oil fed from both a master cylinder and an outlet of an oil pump to said wheel brake;
   an NC (normally close)-type solenoid valve arranged at a downstream line of said wheel brake and controlling a flow of pressurized oil discharged from said wheel brake;
   an oil suction line connecting said master cylinder to an inlet of said oil pump and feeding pressurized oil from the master cylinder to the oil pump during a TCS (traction control system) mode;
   an NC-type shuttle valve mounted on said oil suction line to oven or close the oil suction line;
   a low/intermediate pressure accumulator connected to both an outlet of the NC-type solenoid valve and the oil suction line so as to store the pressurized oil discharged from the wheel brake during an ABS (anti-lock brake system) pressure reducing mode, and feed the stored pressurized oil to the inlet of the oil pump during an ABS pressure increasing mode, said pressure accumulator also storing the pressurized oil outputted from the oil pump to feed the stored pressurized oil to the inlet of the oil pump during an ESP (electronic stability program) mode; and
   an oil charging line extending from said outlet of the oil pump to the low/intermediate pressure accumulator;
   a first control valve mounted on said oil charging line to open or close the oil charging line;
   an oil feeding line branching from the oil charging line at a downstream position after the first control valve and connected to the oil suction line at a downstream position after the NC-type shuttle valve; and
   a second control valve mounted on said oil feeding line to open or close the oil feeding line such that the oil feeding line is opened during the ESP mode so as to feed the pressurized oil from the low/intermediate pressure accumulator to the inlet of said oil pump.

2. The electronically controlled brake system according to claim 1, wherein said first and second control valves are NC-type solenoid valves.

3. The electronically controlled brake system according to claim 1, wherein said first control valve is a check valve which is opened when pressure of oil outputted from the oil pump is not lower than a predetermined reference level, and which prevents an inverse flow of pressurized oil charged in the low/intermediate pressure accumulator.

4. The electronically controlled brake system according to claim 1, wherein said low/intermediate pressure accumulator comprises:
   a cylinder receiving pressurized oil therein;
   a piston received in said cylinder to extend from or retract into the cylinder in accordance with a flow of pressurized oil into or from the cylinder;
   an elastic member elastically supporting the piston; and
   a position sensor sensing a movement of the piston exceeding a predetermined stroke,
   whereby said position sensor stops an operation of the oil pump when the piston moves by a length exceeding the predetermined stroke during an oil charging mode.

5. The electronically controlled brake system according to claim 4, wherein a check valve is mounted on an oil line extending from the inlet of the oil pump to the low/intermediate pressure accumulator, said check valve thus opening the oil line to feed pressurized oil from the low/intermediate pressure accumulator to the inlet of the oil pump when pressure of the pressurized oil discharged from the wheel brake to the low/intermediate pressure accumulator during the ABS pressure reducing mode is not lower than a predetermined reference level.

* * * * *

UNITED STATES PATENT AND TRADEMARK OFFICE
CERTIFICATE OF CORRECTION

PATENT NO. : 6,752,473 B2
DATED : June 22, 2004
INVENTOR(S) : I-Jin Yang It is certified that error appears in the above-identified patent and that said Letters Patent is hereby corrected as shown below:

Title page,
Item [56], References Cited, U.S. PATENT DOCUMENTS, add
-- 6,120,111      9/2000  Sakai……….303/116.1 --; add the title
-- FOREIGN PATENT DOCUMENTS
DE      41 38 027 A1    5/1993
DE      197 16 988 A1   10/1988
EP      0 728 646 A2    8/1996
EP      1 081 007 A2    3/2001
JP      11-059377       3/1999
WO      91/06454        5/1991
WO      93/21047        10/1993 --

Signed and Sealed this

Fourteenth Day of September, 2004

JON W. DUDAS
*Director of the United States Patent and Trademark Office*